(12) United States Patent
Shioda

(10) Patent No.: US 10,443,476 B2
(45) Date of Patent: Oct. 15, 2019

(54) CATALYST DEVICE

(71) Applicant: TOYOTA JIDOSHA KABUSHIKI KAISHA, Toyota-shi, Aichi-ken (JP)

(72) Inventor: Jumpei Shioda, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/124,968

(22) Filed: Sep. 7, 2018

(65) Prior Publication Data
US 2019/0112960 A1 Apr. 18, 2019

(30) Foreign Application Priority Data

Oct. 12, 2017 (JP) .................. 2017-198695

(51) Int. Cl.
*F01N 3/28* (2006.01)
*B01D 53/88* (2006.01)
*F01N 13/14* (2010.01)
*B01D 53/94* (2006.01)

(52) U.S. Cl.
CPC .......... *F01N 3/2857* (2013.01); *B01D 53/88* (2013.01); *F01N 3/2864* (2013.01); *F01N 13/141* (2013.01); *F01N 13/143* (2013.01); *B01D 53/9454* (2013.01); *F01N 2260/08* (2013.01); *F01N 2470/10* (2013.01)

(58) Field of Classification Search
CPC .. F01N 3/2857; F01N 3/2864; F01N 2470/10; B01D 53/88

USPC ........................................................ 422/179
See application file for complete search history.

(56) References Cited

U.S. PATENT DOCUMENTS

2013/0055702 A1\* 3/2013 Watanabe ............. F01N 3/2026
60/300

FOREIGN PATENT DOCUMENTS

| EP | 1422411 A2 | 5/2004 |
| JP | H07-324618 A | 12/1995 |
| JP | 2004-176553 A | 6/2004 |
| JP | 2011-153536 A | 8/2011 |

\* cited by examiner

*Primary Examiner* — Tom P Duong
(74) *Attorney, Agent, or Firm* — Oliff PLC

(57) ABSTRACT

A catalyst device includes a catalyst support, a tubular portion, which accommodates the catalyst support, a holding mat, which holds the catalyst support, an insulator provided over the outer circumferential surface of the tubular portion, and a heat insulating member arranged between the insulator and the tubular portion. The region of the outer circumferential surface of the tubular portion between the upstream end and the downstream end in the exhaust gas flowing direction is divided into two subregions arranged in a direction of the axis of the tubular portion. Of the two subregions, the subregion on the upstream side is defined as an upstream subregion, and the subregion on the downstream side is defined as a downstream subregion. The area that is covered with the heat insulating member in the downstream subregion is smaller than the area that is covered with the heat insulating member in the upstream subregion.

4 Claims, 4 Drawing Sheets

CATALYST DEVICE

CROSS REFERENCE TO RELATED APPLICATION

This application claims priority from Japanese Patent Application No. 2017-198695, filed on Oct. 12, 2017, the disclosure of which is incorporated herein by reference in its entirety.

BACKGROUND

The present disclosure relates to a catalyst device provided in the exhaust system of an internal combustion engine.

A type of catalyst device that includes a catalyst support, a tubular portion, and a holding mat has been known. The catalyst support supports a catalyst that purifies exhaust gas of the internal combustion engine. The tubular portion accommodates the catalyst support. The holding mat is arranged between the catalyst support and the tubular portion to hold the catalyst support in the tubular portion. For example, refer to Japanese Laid-Open Patent Publication No. 2004-176553.

By providing an insulator over the outer circumferential surface of the tubular portion and a heat insulating member between the tubular portion and the insulator, the tubular portion is covered with the heat insulating member. Since this configuration reduces the heat radiation amount of the tubular portion, the temperature increase of the catalyst support due to the exhaust heat is further promoted. This improves the exhaust purification performance.

If the tubular portion is covered with a heat insulating member, the diameter expansion amount of the tubular portion due to thermal expansion increases in the entire tubular portion, increasing the clearance between the tubular portion and the catalyst support. This reduces the holding force of the holding mat, which is arranged in the clearance in a compressed state. When the holding force of the holding mat decreases, the catalyst support, of which the outer circumferential surface is wrapped with the holding mat, may move downstream in the exhaust gas flowing direction, for example, due to factors such as the exhaust pressure. In this case, there is a possibility that the arrangement position of the catalyst support may be displaced in the tubular portion.

SUMMARY

An objective of the present disclosure is to provide a catalyst device capable of limiting displacement of the catalyst support in the tubular portion.

In accordance with one aspect of the present disclosure, a catalyst device for an internal combustion engine is provided. The catalyst device includes a catalyst support, which supports a catalyst that purifies exhaust gas of the internal combustion engine, a tubular portion, which accommodates the catalyst support, a holding mat, which is arranged between the catalyst support and the tubular portion to hold the catalyst support in the tubular portion while being wrapped around an outer circumferential surface of the catalyst support, an insulator, which is provided over the outer circumferential surface of the tubular portion, and a heat insulating member, which is arranged between the insulator and the tubular portion. A region of the outer circumferential surface of the tubular portion between an upstream end and a downstream end in an exhaust gas flowing direction is divided into two subregions arranged in a direction of an axis of the tubular portion. Of the two subregions, the subregion on an upstream side is defined as an upstream subregion, and the subregion on a downstream side is defined as a downstream subregion. An area that is covered with the heat insulating member in the downstream subregion is smaller than an area that is covered with the heat insulating member in the upstream subregion.

With this configuration, the area covered with the heat insulating member in the downstream subregion of the outer circumferential surface of the tubular portion is smaller than the area covered with the heat insulating member in the upstream subregion. Thus, the heat radiation amount on the downstream side of the tubular portion is greater than the heat radiation amount on the upstream side of the tubular portion. Therefore, when the tubular portion is heated by the exhaust heat, the temperature of the tubular portion is lower on the downstream side than on the upstream side. Accordingly, the closer to the downstream end, the greater the diameter expansion amount of the tubular portion becomes during thermal expansion. Therefore, when the tubular portion is heated, the diameter of the whole tubular portion is increased. At such thermal expansion of the tubular portion, the tubular portion has a tapered shape in which a portion on the downstream side has a smaller diameter than a portion on the upstream side. Thus, during thermal expansion of the tubular portion, the catalyst support is pushed by the exhaust gas while being wrapped with the holding mat. As a result, even if the catalyst support attempts to move downstream in the tubular portion, the catalyst support, which is wrapped with the holding mat, is restrained from moving downstream since the diameter on the downstream side of the tubular portion is smaller than that on the upstream side. This limits the displacement of the catalyst support in the tubular portion.

Also, in the above-described configuration, the diameter expansion amount of the tubular portion due to thermal expansion is smaller on the downstream side than on the upstream side. Thus, with this configuration, the amount of compression of the holding mat arranged on the downstream side is increased as compared with a case in which the diameter expansion amount on the downstream side is equal to that on the upstream side. This also limits the displacement of the catalyst support in the tubular portion.

In the above-described catalyst device, the heat insulating member may include a first heat insulating portion, which is arranged in the upstream subregion, and a second heat insulating portion, which is arranged in the downstream subregion. The first heat insulating portion may be arranged to cover the entire outer circumferential surface of the tubular portion, which faces the insulator. The second heat insulating portion may be arranged to cover only a part of the outer circumferential surface of the tubular portion, which faces the insulator.

With this configuration, the heat insulating member has the first heat insulating portion and the second heat insulating portion. This makes the area covered with the heat insulating member in the downstream subregion of the outer circumferential surface of the tubular portion smaller than the area covered with the heat insulating member in the upstream subregion.

In the above-described catalyst device, the heat insulating member may be fixed to an inner circumferential surface of the insulator, which faces the outer circumferential surface of the tubular portion.

If the heat insulating member is fixed to the tubular portion, replacement of the heat insulating member requires removal of the heat insulating member from the tubular portion after the insulator is detached and also installation of an insulator after a heat insulating member is attached to the tubular portion. In this respect, with the above configuration, since the heat insulating member is fixed to the insulator, it is possible to replace the heat insulating member only by replacing the insulator. This eliminates the necessity for removal of the heat insulating member from the tubular portion and installation of the heat insulating member in the tubular portion. The configuration thus simplifies the replacement operation of the heat insulating member.

Other aspects and advantages of the present disclosure will become apparent from the following description, taken in conjunction with the accompanying drawings, illustrating exemplary embodiments.

BRIEF DESCRIPTION OF THE DRAWINGS

The disclosure may be understood by reference to the following description together with the accompanying drawings.

DETAILED DESCRIPTION

A catalyst device according to one embodiment will now be described with reference to FIGS. 1 to 6.

Figure 1:
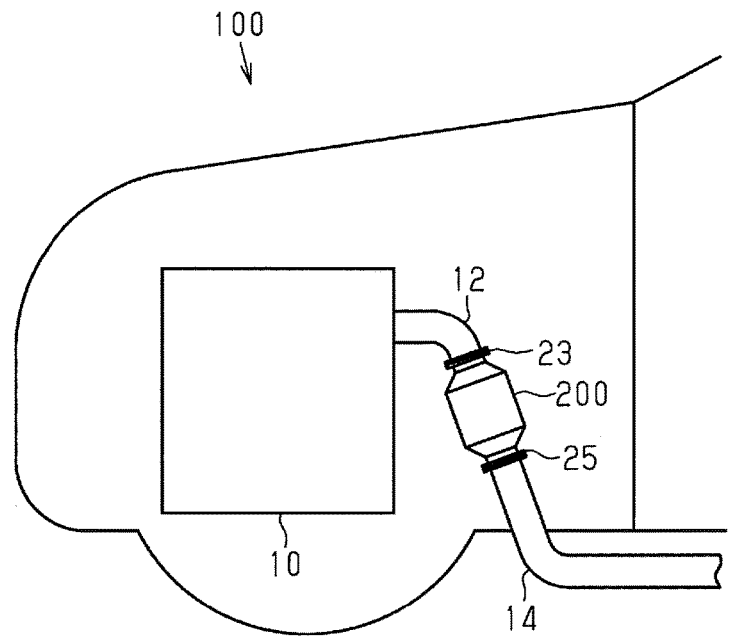
FIG. 1 is a schematic diagram of a vehicle equipped with an internal combustion engine to which a catalyst device according to one embodiment is applied.

As shown in FIG. 1, a vehicle 100 includes an internal combustion engine 10 in the front. An exhaust manifold 12, a catalyst device 200 of the present embodiment, and an exhaust pipe 14 are connected to the internal combustion engine 10 in order from the upstream side to the downstream side in the exhaust gas flowing direction. The catalyst device 200 is installed upright to be slightly inclined relative to the vertical direction so that exhaust gas flows downward in the vehicle.

Figure 2:
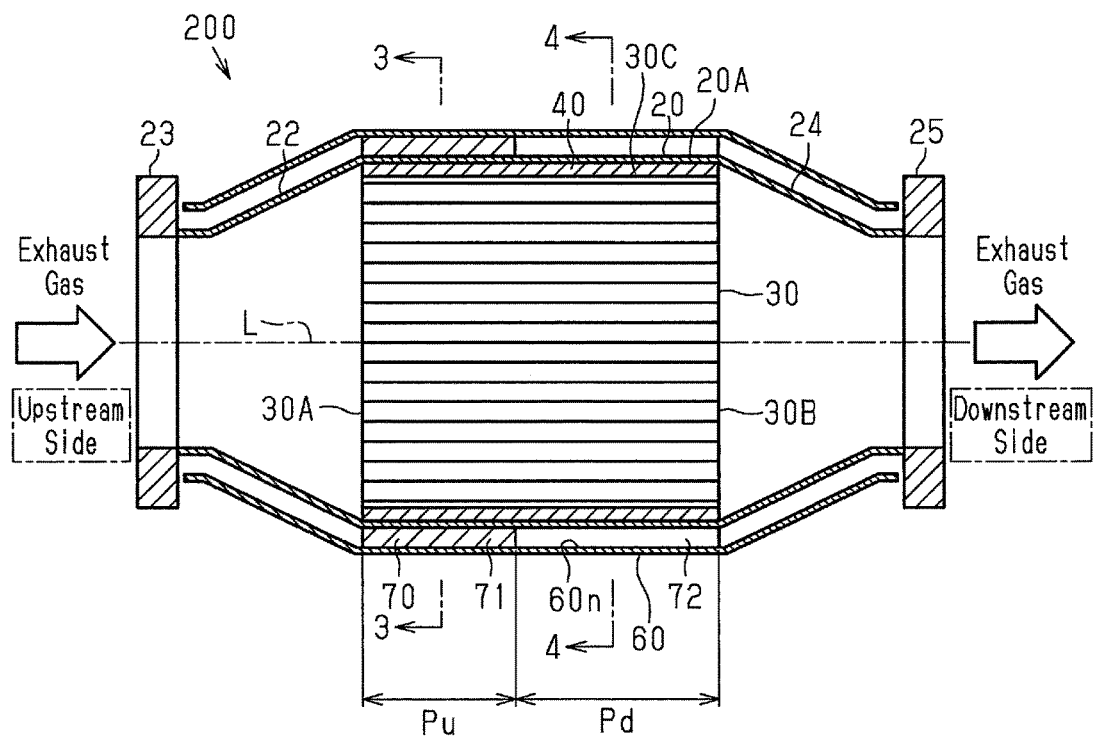
FIG. 2 is a cross-sectional view of the catalyst device of FIG. 1.

As shown in FIG. 2, the catalyst device 200 has a catalyst support 30, a cylindrical tubular portion 20, and a holding mat 40. The catalyst support 30 supports a catalyst such as platinum, which purifies exhaust gas. The tubular portion 20 accommodates the catalyst support 30. The holding mat 40 is arranged between the catalyst support 30 and the tubular portion 20 to hold the catalyst support 30 in the tubular portion 20.

The catalyst support 30 is constituted by a column of ceramic. The catalyst support 30 has minute exhaust passages that extend parallel to the axis L of the catalyst support 30. The catalyst is supported in each of the exhaust passages. The catalyst support 30 may be made of metal.

The holding mat 40 is wrapped about the entire outer circumferential surface 30C of the catalyst support 30. The holding mat 40 is arranged in a compressed state in the clearance between the catalyst support 30 and the tubular portion 20 and holds the catalyst support 30 in the tubular portion 20 by utilizing the elastic force. That is, the holding mat 40 is arranged between the catalyst support 30 and the tubular portion 20 to hold the catalyst support 30 in the tubular portion 20 while being wrapped around the outer circumferential surface 30C of the catalyst support 30. In the present embodiment, the holding mat 40 is made of glass wool, but it may be made of other material.

The upstream end of the tubular portion 20 is connected to an upstream tapering portion 22, which decreases in diameter toward its upstream end. An upstream flange 23, to which the exhaust manifold 12 is connected, is provided at the upstream end of the upstream tapering portion 22.

The downstream end of the tubular portion 20 is connected to a downstream tapering portion 24, which decreases in diameter toward its downstream end. A downstream flange 25, to which the exhaust pipe 14 is connected, is provided at the downstream end of the downstream tapering portion 24. Although the tubular portion 20, the upstream tapering portion 22, the upstream flange 23, the downstream tapering portion 24, and the downstream flange 25 are all made of stainless steel, these components may be made of other metal.

A plate-shaped insulator 60 is provided over the outer circumferential surface 20A of the tubular portion 20. The insulator 60 is arranged to cover the entire outer circumferential surface of the tubular portion 20, the upstream tapering portion 22, and the downstream tapering portion 24. The insulator 60 is fixed to the tubular portion 20 with a predetermined clearance created between the insulator 60 and the body of the tubular portion 20, the upstream tapering portion 22, and the downstream tapering portion 24. In the present embodiment, the insulator 60 is made of stainless steel, but it may be made of other material.

A heat insulating member 70 made of glass wool is arranged in the clearance between the tubular portion 20 and the insulator 60. The heat insulating member 70 may be made of a material other than glass wool.

The heat insulating member 70 is fixed to an inner circumferential surface 60n of the insulator 60 that faces the outer circumferential surface 20A of the tubular portion 20.

The region in the outer circumferential surface 20A of the tubular portion 20 that is between an upstream end 30A and a downstream end 30B of the tubular portion 20 is divided into two subregions arranged in the direction of the axis L of the tubular portion 20. Of the two subregions, the subregion on the upstream side is defined as an upstream subregion Pu, and the subregion on the downstream side is defined as a downstream subregion Pd. The heat insulating member 70 includes a first heat insulating portion 71, which is arranged in the upstream subregion Pu, and two second heat insulating portions 72, which are arranged in the downstream subregion Pd.

Figure 3:
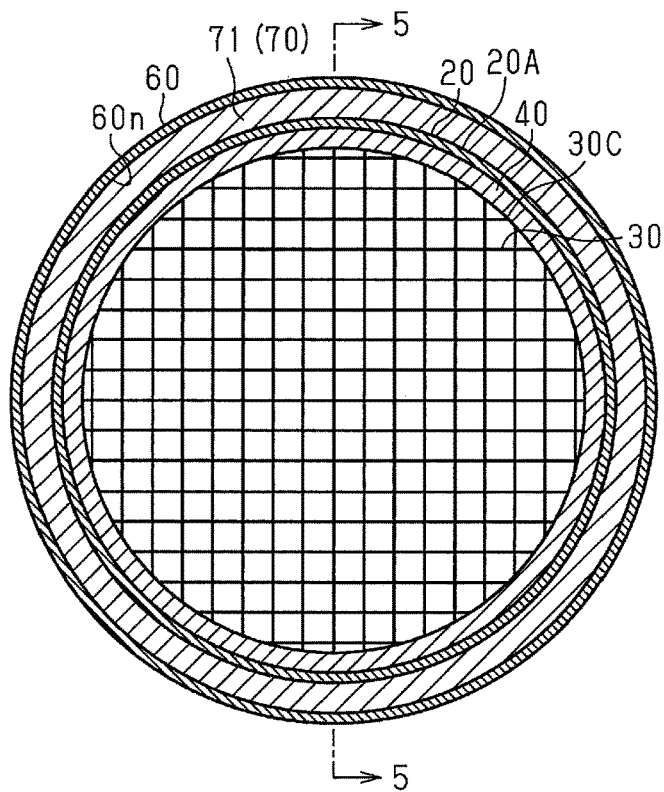
FIG. 3 is a cross-sectional view taken along line 16-16 of FIG. 2.
Figure 5:
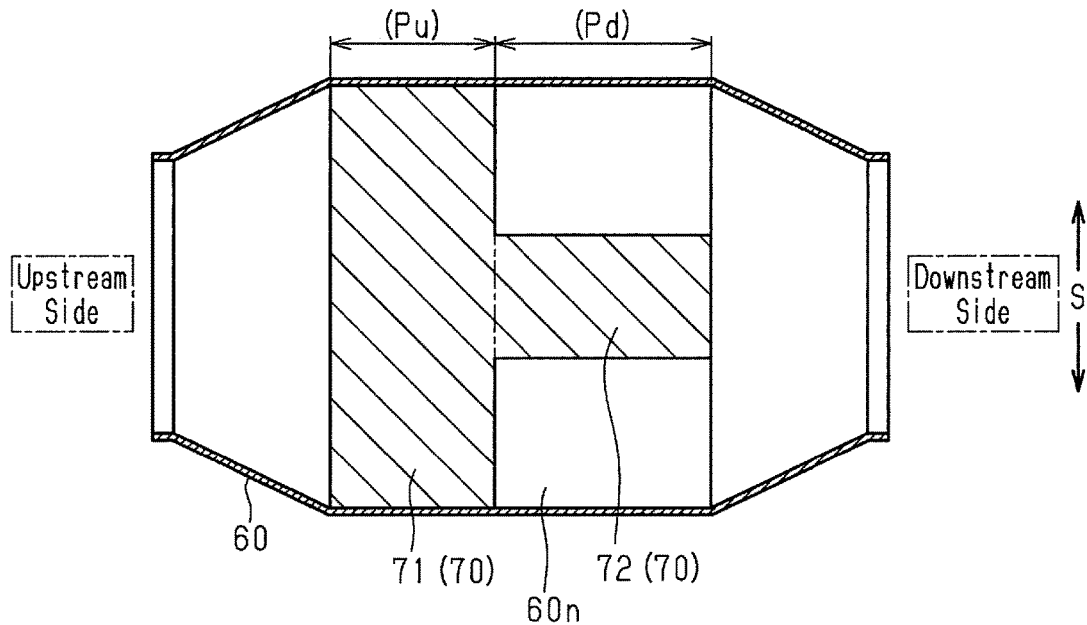
FIG. 5 is a cross-sectional view taken along line 5-5 of FIG. 3.

As shown in FIG. 3, the first heat insulating portion 71 is arranged to cover the entire outer circumferential surface 20A of the tubular portion 20, which faces the insulator 60, in the upstream subregion Pu of the tubular portion 20. More specifically, as shown in FIG. 5, the first heat insulating portion 71 is arranged in a section of the inner circumferential surface 60n of the insulator 60 that faces the upstream subregion Pu of the tubular portion 20 and over the entire inner circumferential surface 60n in the circumferential direction S.

Figure 4:
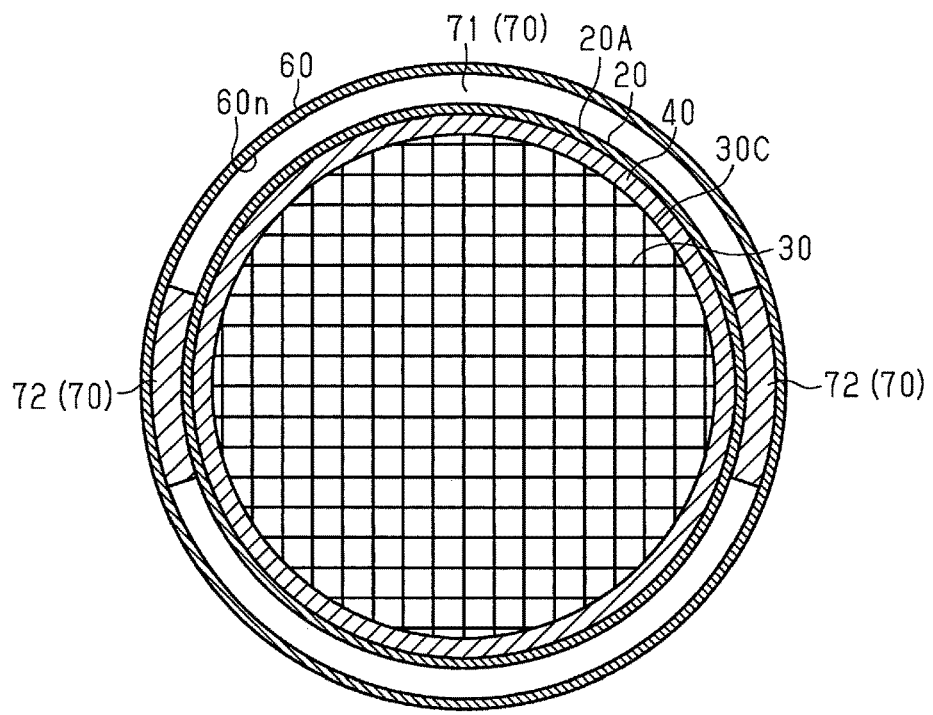
FIG. 4 is a cross-sectional view taken along line 4-4 of FIG. 2.

Also, as shown in FIG. 4, each second heat insulating portion 72 is arranged to cover only a part of the outer circumferential surface 20A of the tubular portion 20, which faces the insulator 60, in the downstream subregion Pd of the tubular portion 20. More specifically, as shown in FIG. 5, each second heat insulating portion 72 is arranged in a section of the inner circumferential surface 60n of the insulator 60 that faces the downstream subregion Pd of the tubular portion 20 and in a section of the inner circumferential surface 60n in the circumferential direction S. In the present embodiment, as shown in FIG. 4, the second heat insulating portions 72 are arranged in two positions of the outer circumferential surface 20A of the tubular portion 20. The angular spacing or arrangement phase of the two second heat insulating portions 72 in the circumferential direction of the outer circumferential surface 20A of the tubular portion 20 is 180°. The number of the second heat insulating portions 72 and the angular spacing, that is, the arrangement phase may be changed as necessary.

The present embodiment as described above achieves the following advantages.

(1) The heat insulating member 70 includes the first heat insulating portion 71, which is arranged in the upstream subregion Pu of the outer circumferential surface 20A of the tubular portion 20, and the second heat insulating portions 72, which are arranged in the downstream subregion Pd of the outer circumferential surface 20A of the tubular portion 20. As shown in FIGS. 3 and 4, the first heat insulating portion 71 is arranged to cover the entire outer circumferential surface 20A of the tubular portion 20, which faces the insulator 60. Each second heat insulating portion 72 is arranged to cover only part of the outer circumferential surface 20A of the tubular portion 20, which faces the insulator 60.

Thus, the area covered with the heat insulating member 70 in the downstream subregion Pd of the outer circumferential surface 20A of the tubular portion 20 is smaller than the area covered with the heat insulating member 70 in the upstream subregion Pu. The heat radiation amount on the downstream side of the tubular portion 20 is greater than the heat radiation amount on the upstream side of the tubular portion 20. Therefore, when the tubular portion 20 is heated by the exhaust heat, the temperature of the tubular portion 20 is lower on the downstream side than on the upstream side. Accordingly, the closer to the downstream end, the smaller the diameter expansion amount of the tubular portion 20 becomes during thermal expansion.

Figure 6:
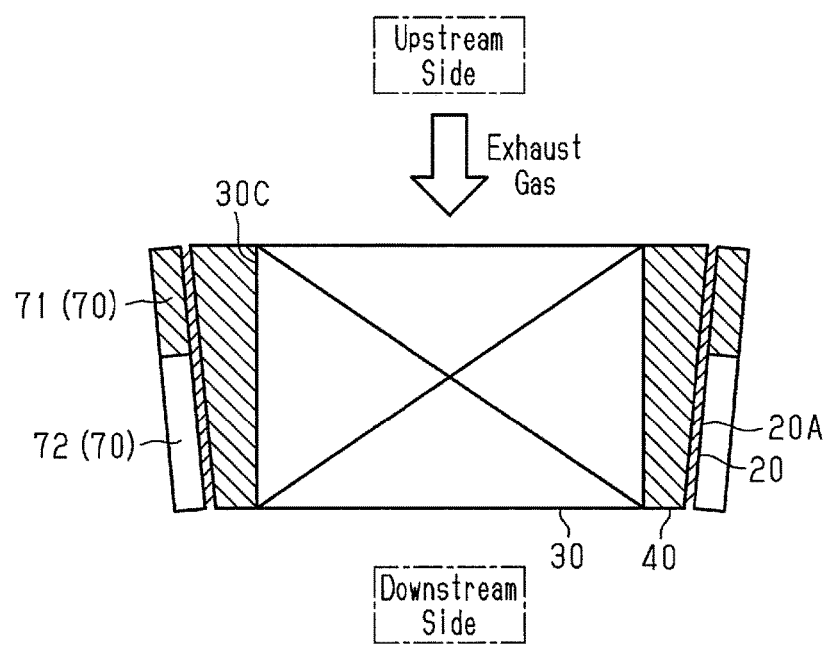
FIG. 6 is a schematic diagram showing thermal deformation of the catalyst device of the embodiment.

Therefore, as shown in FIG. 6, when the tubular portion 20 is heated, the entire tubular portion 20 expands in diameter. In such thermal expansion of the tubular portion 20, the tubular portion 20 has a substantially tapered shape in which the diameter is smaller on the downstream side than on the upstream side. Therefore, during thermal expansion of the tubular portion 20, the catalyst support 30 is pushed by the exhaust gas while being wrapped with the holding mat 40. Even if the catalyst support 30 attempts to move downstream in the tubular portion 20, the catalyst support 30, which is wrapped with the holding mat 40, is restrained from moving downstream since the diameter of the tubular portion 20 on the downstream side is smaller than that on the upstream side. This limits the displacement of the catalyst support 30 in the tubular portion 20.

In the present embodiment, the catalyst device 200 is installed upright so that the exhaust gas flows downward in the vehicle. Therefore, the catalyst support 30, which is wrapped with the holding mat 40, attempts to move downstream also by the gravity. However, as described above, thermal expansion of the tubular portion 20 deforms the tubular portion 20 to have a substantially tapered shape in which the diameter is smaller on the downstream side than on the upstream side. This restrains the catalyst support 30, which is wrapped with the holding mat 40, from moving downstream by the gravity.

Also, as described above, in the present embodiment, the diameter expansion amount of the tubular portion 20 due to thermal expansion is smaller on the downstream side than on the upstream side. Therefore, as compared with a case in which, for example, the entire outer circumferential surface 20A of the tubular portion 20 is covered with a heat insulating member so that the diameter expansion amount on the downstream side is equal to that on the upstream side, the compression amount of the holding mat 40, which is arranged on the downstream side, is increased. This increases the holding force of the holding mat 40. This also limits the displacement of the catalyst support 30 in the tubular portion 20.

(2) If the heat insulating member 70 is fixed to the tubular portion 20, replacement of the heat insulating member 70 requires removal of the heat insulating member 70 from the tubular portion 20 after the insulator 60 is detached and also installation of an insulator 60 after a heat insulating member 70 is attached to the tubular portion 20.

In this respect, the heat insulating member 70 is fixed to the inner circumferential surface 60n of the insulator 60, which faces the outer circumferential surface 20A of the tubular portion 20 as shown in FIG. 5 in the present embodiment. More specifically, the first heat insulating portion 71 is provided over the entire inner circumferential surface 60n of the insulator 60 in the circumferential direction. The second heat insulating portions 72 are provided in parts of the inner circumferential surface 60n of the insulator 60 in the circumferential direction. Since the heat insulating member 70 is fixed to the insulator 60, it is possible to replace the heat insulating member 70 only by replacing the insulator 60. This eliminates the necessity for removal of the heat insulating member 70 from the tubular portion 20 and installation of the heat insulating member 70 to the tubular portion 20. This simplifies the replacement operation of the heat insulating member 70.

(3) In the section of the outer circumferential surface 20A of the tubular portion 20 where the second heat insulating portions 72 are arranged, the second heat insulating portions 72 prevent the insulator 60 from directly contacting the outer circumferential surface 20A of the tubular portion 20 due to vibration. Therefore, as compared with the case in which the second heat insulating portions 72 are not provided, it is possible to suppress the generation of noise due to the contact between the insulator 60 and the tubular portion 20.

The above-described embodiment may be modified as follows.

In the above-described embodiment, the insulator 60 is arranged to cover the entire outer circumferential surface 20A of the tubular portion 20, the upstream tapering portion 22, and the downstream tapering portion 24. Alternatively, the insulator 60 may be arranged to cover the outer circumferential surface 20A of at least the tubular portion 20.

Figure 7:
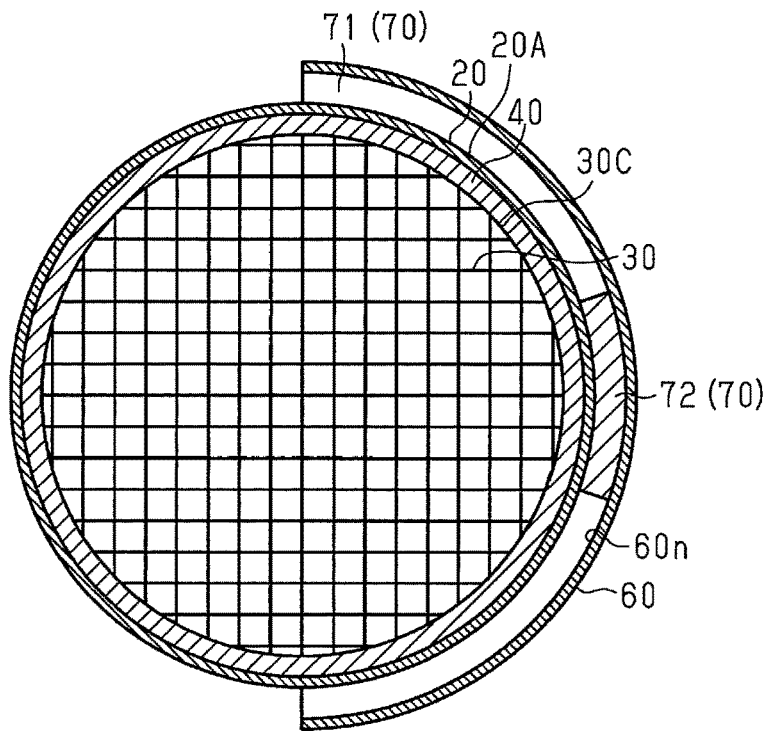
FIG. 7 is a cross-sectional view in the radial direction of the catalyst device according to a modification of the embodiment.

In the above-described embodiment, the insulator 60 is arranged to cover the entire outer circumferential surface 20A of the tubular portion 20 in the circumferential direction as shown in FIG. 3. Instead, as shown in FIG. 7, the insulator 60 may be arranged to cover a part of the outer circumferential surface 20A of the tubular portion 20 in the circumferential direction. Further, the heat insulating member 70 described above may be arranged between the insulator 60 and the tubular portion 20.

Figure 8:
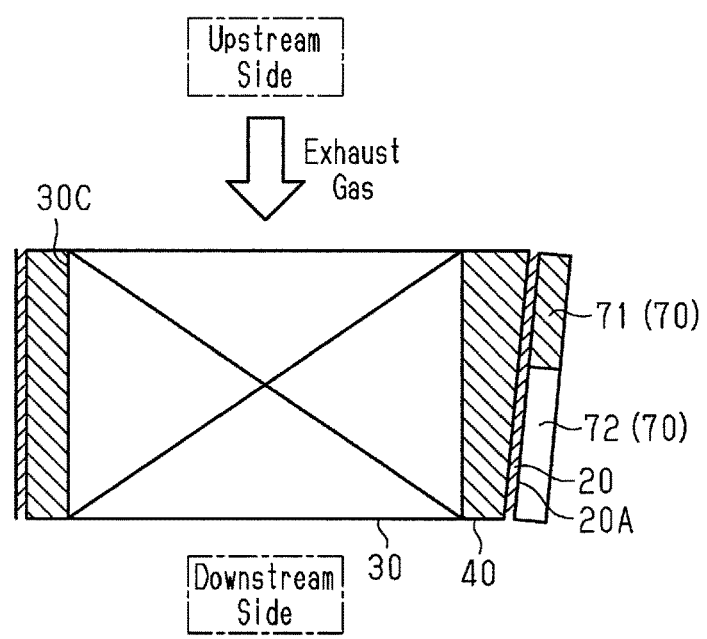
FIG. 8 is a schematic diagram showing thermal deformation of the catalyst device of the modification.

Even in this case, as shown in FIG. 8, in the region of the outer circumferential surface 20A of the tubular portion 20 that faces the insulator 60 (hereinafter, referred to as a facing region), the first heat insulating portion 71 is arranged on the upstream side of the outer circumferential surface 20A of the tubular portion 20. The second heat insulating portions 72 are arranged in sections of the outer circumferential surface 20A of the tubular portion 20 that are located downstream of the section in which the first heat insulating portion 71 is arranged.

Thus, the area of the section of the outer circumferential surface 20A of the tubular portion 20 that is covered with the heat insulating member 70 is smaller on the downstream side of the tubular portion 20 than on the upstream side. Therefore, in the outer circumferential surface 20A of the tubular portion 20 of the facing region, the heat radiation amount on the downstream side of the tubular portion 20 is greater than the heat radiation amount on the upstream side, so that, in the facing region, the temperature of the tubular portion 20 is lower on the downstream side than on the upstream side.

Also, with this modification also, the diameter expansion amount of the tubular portion 20 due to thermal expansion in the facing region is smaller on the downstream side than on the upstream side. The tubular portion 20 is deformed into a substantially tapered shape in which the diameter is smaller on the downstream side than on the upstream side. Therefore, in this modification also, the advantages equivalent to those described above are achieved.

In the above-described embodiment, the heat insulating member 70 is fixed to the insulator 60. Alternatively, the heat insulating member 70 may be fixed to the outer circumferential surface 20A of the tubular portion 20, which faces the inner circumferential surface 60n of the insulator 60. In this case, for example, the first heat insulating portion 71 may be provided over the entire outer circumferential surface 20A of the tubular portion 20 in the circumferential direction in the upstream subregion Pu. The second heat insulating portion 72 may be provided only in a part in the circumferential direction of the outer circumferential surface 20A of the tubular portion 20 in the downstream subregion Pd. In this case also, the advantages (1) and (3) are achieved.

In the above-described embodiment, the first heat insulating portion 71 is arranged to cover the entire outer circumferential surface 20A of the tubular portion 20, which faces the insulator 60, in the upstream subregion Pu of the tubular portion 20. Alternatively, like the second heat insulating portions 72, the first heat insulating portion 71 may also be arranged to cover only a part of the outer circumferential surface 20A of the tubular portion 20, which faces the insulator 60, in the upstream subregion Pu of the tubular portion 20. The shape of the heat insulating member 70 may be determined such that the area of the section of the outer circumferential surface 20A of the tubular portion 20 that is covered with each second heat insulating portion 72 is smaller than the area of the section covered with the first heat insulating portion 71. With this modification also, the heat radiation amount on the downstream side of the tubular portion 20 is greater than the heat radiation amount on the upstream side, so that the temperature of the tubular portion 20 is lower on the downstream side than on the upstream side. Thus, the tubular portion 20 is deformed into a substantially tapered shape in which the diameter is smaller on the downstream side than on the upstream side. This also limits the displacement of the catalyst support 30 in the tubular portion 20.

Therefore, the present examples and embodiments are to be considered as illustrative and not restrictive and the disclosure is not to be limited to the examples and embodiments given herein.

The invention claimed is:

1. A catalyst device for an internal combustion engine, comprising:
    a catalyst support, which supports a catalyst that purifies exhaust gas of the internal combustion engine;
    a tubular portion, which accommodates the catalyst support;
    a holding mat, which is arranged between the catalyst support and the tubular portion to hold the catalyst support in the tubular portion while being wrapped around an outer circumferential surface of the catalyst support;
    an insulator, which is provided over the outer circumferential surface of the tubular portion; and
    a heat insulating member, which is arranged between the insulator and the tubular portion, wherein
    a region of the outer circumferential surface of the tubular portion between an upstream end and a downstream end in an exhaust gas flowing direction is divided into two subregions arranged in a direction of an axis of the tubular portion,
    of the two subregions, the subregion on an upstream side is defined as an upstream subregion, and the subregion on a downstream side is defined as a downstream subregion, and
    an area that is covered with the heat insulating member in the downstream subregion is smaller than an area that is covered with the heat insulating member in the upstream subregion,
    wherein
    the heat insulating member includes a first heat insulating portion, which is arranged in the upstream subregion, and a second heat insulating portion, which is arranged in the downstream subregion,
    the first heat insulating portion is arranged to cover the entire outer circumferential surface of the tubular portion, which faces the insulator, and
    the second heat insulating portion is arranged to cover only a part of the outer circumferential surface of the tubular portion, which faces the insulator.

2. The catalyst device according to claim 1, wherein the heat insulating member is fixed to an inner circumferential surface of the insulator, which faces the outer circumferential surface of the tubular portion.

3. A catalyst device for an internal combustion engine, comprising:
    a catalyst support, which supports a catalyst that purifies exhaust gas of the internal combustion engine;
    a tubular portion, which accommodates the catalyst support;
    a holding mat, which is arranged between the catalyst support and the tubular portion to hold the catalyst support in the tubular portion while being wrapped around an outer circumferential surface of the catalyst support;
    an insulator, which is provided over the outer circumferential surface of the tubular portion; and
    a heat insulating member, which is arranged between the insulator and the tubular portion, wherein a region of the outer circumferential surface of the tubular portion between an upstream end and a downstream end in an exhaust gas flowing direction is divided into two subregions arranged in a direction of an axis of the tubular portion, of the two subregions, the subregion on an upstream side is defined as an upstream subregion, and the subregion on a downstream side is defined as a downstream subregion, and an area that is covered with the heat insulating member in the downstream subregion is smaller than an area that is covered with the heat insulating member in the upstream subregion, the heat insulating member includes a first heat insulating portion, which is arranged in the upstream subregion, and a second heat insulating portion, which is arranged in the downstream subregion, the first heat insulating portion is arranged to cover only a part of the outer circumferential surface of the tubular portion, which faces the insulator, and the second heat insulating portion is arranged to cover only a part of the outer circumferential surface of the tubular portion, which faces the insulator.

4. The catalyst device according to claim 3, wherein the heat insulating member is fixed to an inner circumferential surface of the insulator, which faces the outer circumferential surface of the tubular portion.

* * * * *